United States Patent [19]

Kaminski

[11] Patent Number: 4,744,247
[45] Date of Patent: May 17, 1988

[54] DEVICE FOR ELECTRICAL MEASUREMENT OF THE LEVEL OF A LIQUID IN A FUEL TANK

[75] Inventor: Detlef Kaminski, Kornwesthein, Fed. Rep. of Germany

[73] Assignee: Daimler Benz Aktiengesellschaft, Fed. Rep. of Germany

[21] Appl. No.: 35,855

[22] Filed: Apr. 8, 1987

[30] Foreign Application Priority Data

Apr. 22, 1986 [DE] Fed. Rep. of Germany ....... 3613521

[51] Int. Cl.$^4$ ............................................. G01F 23/68
[52] U.S. Cl. ........................................ 73/313; 73/308; 338/33
[58] Field of Search ..................... 73/313, 308; 338/33

[56] References Cited

U.S. PATENT DOCUMENTS

| | | | |
|---|---|---|---|
| 2,305,973 | 12/1942 | Marchment | 338/33 |
| 3,935,741 | 2/1976 | Zinsmeyer et al. | 73/313 |
| 4,052,901 | 10/1977 | Bjork | 73/313 |
| 4,184,370 | 1/1980 | Schlick et al. | 338/33 X |

FOREIGN PATENT DOCUMENTS

| | | |
|---|---|---|
| 2435841 | 2/1976 | Fed. Rep. of Germany . |
| 3307288 | 9/1984 | Fed. Rep. of Germany . |
| 3339325 | 5/1985 | Fed. Rep. of Germany . |
| 2835744 | 12/1985 | Fed. Rep. of Germany . |

Primary Examiner—Daniel M. Yasich
Attorney, Agent, or Firm—Barnes & Thornburg

[57] ABSTRACT

A device for electrical measurement of the level of a fluid contained in a fuel tank of a motor vehicle is disclosed. In addition to a variable resistance float sensor in a dip tube, a travel sensor is arranged in the dip tube to determine the distance between the dip tube and the bottom of the tank in order to offset measurement errors caused by tolerances in the manufacture of the tank and resultant differences in the mounting position of the dip tube in the tank. The travel sensor includes a spring load rod extending to the bottom of the tank and a variable resistance connected to the rod to produce a calibration value.

2 Claims, 1 Drawing Sheet

DEVICE FOR ELECTRICAL MEASUREMENT OF THE LEVEL OF A LIQUID IN A FUEL TANK

BACKGROUND AND SUMMARY

The present invention relates to a device for electrical measurement of the level of a liquid contained in the fuel tank of a vehicle. The device has a dip tube sensor mountable on the tank and dippable into the liquid, this sensor having a dip tube with its end extending to the bottom of the tank and a float disposed therein and acting as a floatation body. The dip tube sensor has a first contact bridge with two wiper contacts, with at least one wiper contact being in conductive connection with a resistance strip and another wiper contact being in conductive connection with a contact strip. Both these strips extend along the length of the dip tube. A level indicating device is connected to the terminals of the resistance and contact strips. In this level indicating device, the measured value at the terminal of the contact strip is used to generate a corresponding level indication.

A device of this general type is known from German Published Unexamined Patent Application No. 2,435,841 and serves the purpose of reliably indicating the level of the liquid in the fuel tank even within the reserve range.

As a result of tolerances in the manufacture of the fuel tank and the fact that the weight of the liquid, depending on the fullness of the tank, can cause the bottom of the tank to bulge to a greater or lesser extent, the problem can occur that the distance between the top of the tank and the bottom of the tank is subject to variations. This has the consequence that, especially in the lower fullness range, a sufficiently high indication accuracy of the level in the liquid by a noncalibrated level indicator is no longer achievable. In order to overcome this problem, devices are known wherein the level indicator is composed of a protective tube which is deformable by joints and is fittable between the top of the tank and the bottom of the tank (German Published Unexamined Patent Application No. 3,339 325); or where the level indicator has spring means which ensure compensation for tolerance (German Published Unexamined Patent Application No. 3,307,288, German Patent No. 2,835,744).

In a dip tube sensor according to the general type, which as a rule, because of the structural conditions of the tank, is installed so that its dip tube forms an acute angle with respect to a perpendicular drop to the bottom of the tank, a problem can arise as a result of tolerances in the manufacture of the tank, especially in the flanging area of the sensor. Tolerances in the flanging area cause the installed position of the dip tube sensor to differ so that, primarily in the lower reading range, considerable measurement errors occur since the end of the dip tube is located at a greater or lesser distance from the bottom of the tank.

An object of the present invention is to provide a device for electrical measurement of the fuel in a tank which is able, despite any tolerances in the tank, to achieve high accuracy when measuring the fullness of the tank.

This object and other objects of the present invention are provided in a device for electrically measuring the level of a fluid contained in a fuel tank of a motor vehicle, by providing a device having a dip tube sensor with a travel sensor having a telescoping rod and a spring for pretensioning the telescoping rod out of the dip tube against the bottom of the tank. The telescoping rod has a telescope plate having a contact bridge with at least two wiper contacts. At least one travel sensor wiper contact is conductively connected with the resistance strip, while at least one other travel sensor wiper contact is conductively connected with a second contact strip such that a second measured value at a terminal of the second contact strip is functionally related to a calibration value for the device.

By virtue of the fact that the installed position of the dip tube sensor with respect to the bottom is sensed, it is possible for any measurement errors caused by tolerances to be eliminated by appropriate calibration. This correction is made automatically in certain preferred embodiments having a corresponding additional electrical design of the level-indicating device.

Other objects, advantages and novel features of the present invention will become apparent from the following detailed description of the invention when considered in conjunction with the accompanying drawings.

DETAILED DESCRIPTION OF THE DRAWINGS

Figure 1:
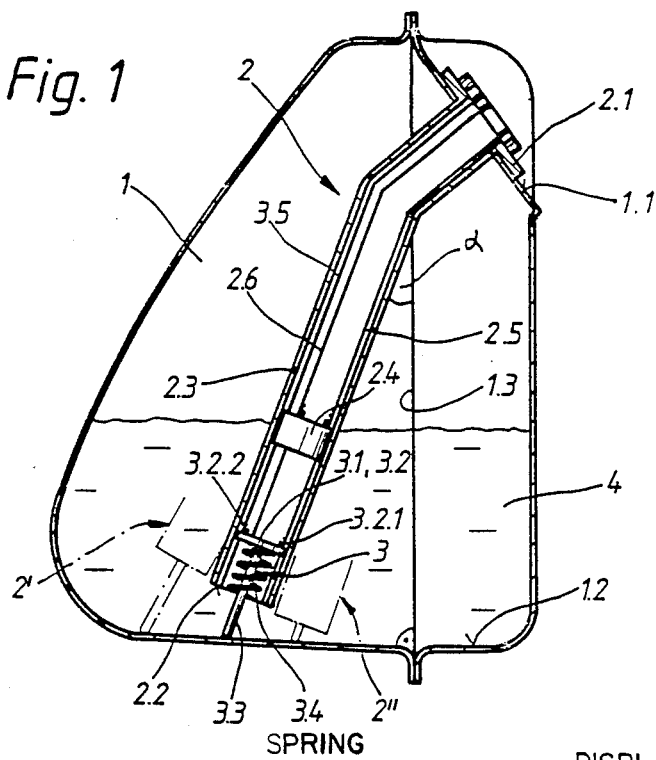
FIG. 1 shows a dip tube sensor built into a tank.

As seen in FIG. 1, a dip tube sensor 2 is built into a fuel tank 1 of a motor vehicle, the sensor 2 being fastened at one end by a flange 2.1 to a corresponding flange area 1.1 of tank 1. Dip tube sensor 2 has its other end 2.2 extending close to the bottom 2.1 of tank 1 and forms an acute angle with respect to a perpendicular 1.3 dropped to the bottom of the tank 1.

As a result of tolerances in the manufacture of the tank 1, especially in the area of its flange area 1.1, the installed position of the dip tube sensor 2 can differ so that the sensor 2, for example, can assume the positions of 2' or 2" indicated by the dashed lines so that end 2.2 can therefore be at different distances a from the tank bottom 1.2. As a result, considerable measurement errors could occur, especially in the range of lower levels.

Figure 2:
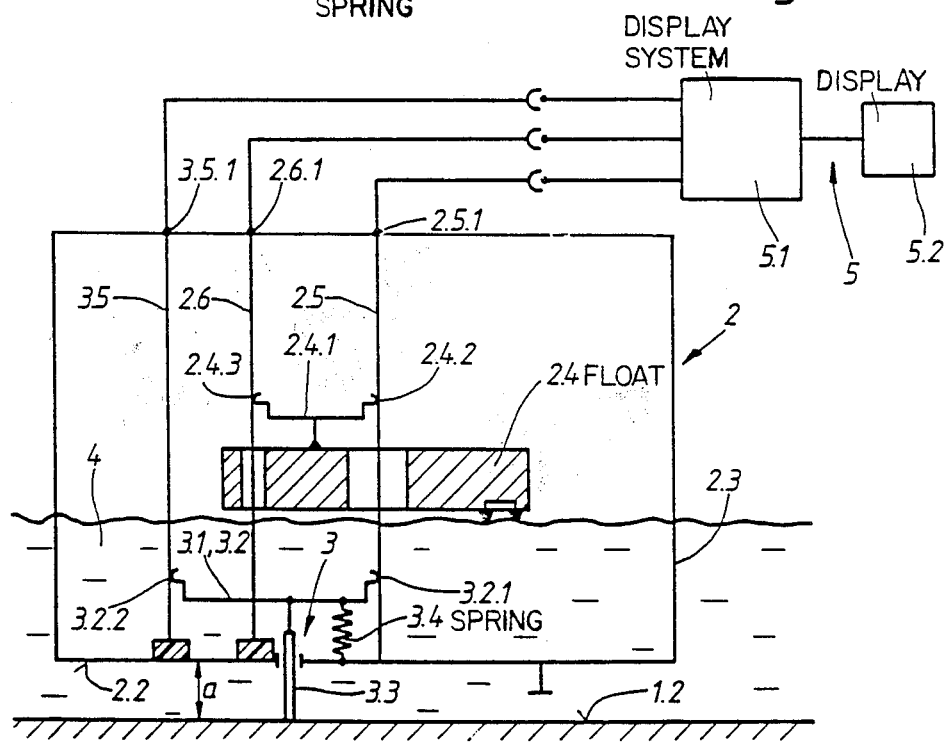
FIG. 2 is a schematic diagram of the dip tube sensor.

In order to offset these measurement errors, a travel sensor 3, displaceable telescopically in the dip tube 2.3, is disposed at the end 2.2 of dip tube 2.3 of dip tube sensor 2. By means of this travel sensor 3, the installation position of dip tube sensor 2 relative to the tank bottom 1.2 can be sensed. This is explained in greater detail by the schematic diagram of FIG. 2.

In a known fashion, a float 2.4 that acts as a body of flotation and floats in liquid 4 is provided in dip tube 2.3. This float 2.4 has a contact bridge 2.4.1 with two wiper contacts 2.4.2 and 2.4.3, where wiper contact 2.4.2 is in a conducting connection with a resistance strip 2.5 and wiper contact 2.4.3 is in a conducting connection with a contact strip 2.6. Both the contact terminal 2.5.1 of resistance strip 2.5 and the terminal 2.6.1 of contact strip 2.6 are electrically connected to a level indicating device 5 comprising an electronic display system 5.1 and a display 5.2. The measured value applied to terminal contact 2.6.1, preferably a voltage divider voltage, serves to generate a corresponding level indication in electronics display system 5.1 which operates on an analog or digital basis and also damps and linearizes the measured value signal.

The travel sensor 3 comprises a telescoping plate 3.1 with a contact bridge 3.2 having two wiper contacts 3.2.1 and 3.2.2. A telescoping rod 3.3 connects with telescoping plate 3.1, this rod 3.3 being tensioned outward against the tank bottom 1.2 by the force of a spring 3.4 from dip tube 2.3. Wiper contact 3.2.1 is in a conducting relationship with resistance strip 2.5 and wiper contact 3.2.2 is similarly related to another contact strip 3.5. The contact strip 3.5 has a contact terminal 3.5.1 which in turn is electrically connected with level indicating device 5.

Depending on the installation position of dip tube sensor 2, therefore, the end 2.2 of dip tube 2.3 will the at a greater or lesser distance from tank bottom 1.2, this distance a being sensed by telescoping rod 3.3. Consequently, telescoping rod 3.3 will extend to a greater or lesser distance out of dip tube 2.3 so that wiper contact 3.2.1 of travel sensor 3 will also assume different positions on resistance strip 2.5. A certain measured value is associated with each tapping point, this value being applied to contact terminal 3.5.1, through wiper contact 3.2.2 and resistance strip 3.5, and serving as a measure of the distance a to the bottom of the tank.

For example, if the dip tube sensor is in a position 2' as shown in FIG. 1, the "reserve" area would be indicated too early. This is offset by the measured value at contact terminal 3.5.1 in level indicating device 5 being used to correct the actual measured level value applied at contact terminal 2.6.1, so that the measured level value is corrected in such fashion that the actual, larger supply of fuel is taken into account. On the other hand, if dip tube sensor 2 is in a position 2", the "reserve" range would be indicated too late. To prevent this, the measured level value is corrected so that the smaller supply of fuel actually present is taken into account.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for electrical measurement of the level of a liquid contained in the fuel tank of a motor vehicle, with dip tube sensor means mountable on the tank and dippable into the liquid, comprising a dip tube with its end extending to the bottom of said tank and a float disposed therein and acting as a flotation body, said float having first contact bridge means with at least two wiper contacts, at least one said wiper contact on said float conductively connected with a resistance strip and another said wiper contact on said float conductively connected with a first contact strip, both of said strips extending along a length of said dip tube, said device having a level indicating device to which terminals of said resistance and said first contact strip are connected and in which a first measured value at said terminal of said first contact strip is used to generate a corresponding level indication, the improvement comprising:
   travel sensor means arranged at one end of said dip tube, said travel sensor means having telescoping rod means extending from the bottom of said dip tube;
   spring means for pretensioning said telescoping rod means out of said dip tube against said bottom of said tank;
   said telescoping rod means having a telescope plate having second contact bridge means with at least two travel sensor wiper contacts;
   a second contact strip extending along the length of said dip tube;
   wherein at least one said travel sensor wiper contact is conductively connected with said resistance strip, and at least one other said travel sensor wiper contact in conductively connected with said second contact strip such that a second measured value at a terminal of said second contact strip is functionally related to a calibration value for said device.

2. A device according to claim 1, wherein said second contact strip terminal is connected to said level indicating device and said second measured value is processed in said level indicating device for correction of said measured value.

* * * * *